April 22, 1958     P. S. BALDWIN     2,831,324
MASTER CYLINDER FOR HYDRAULIC BRAKE SYSTEM
Filed Oct. 17, 1955
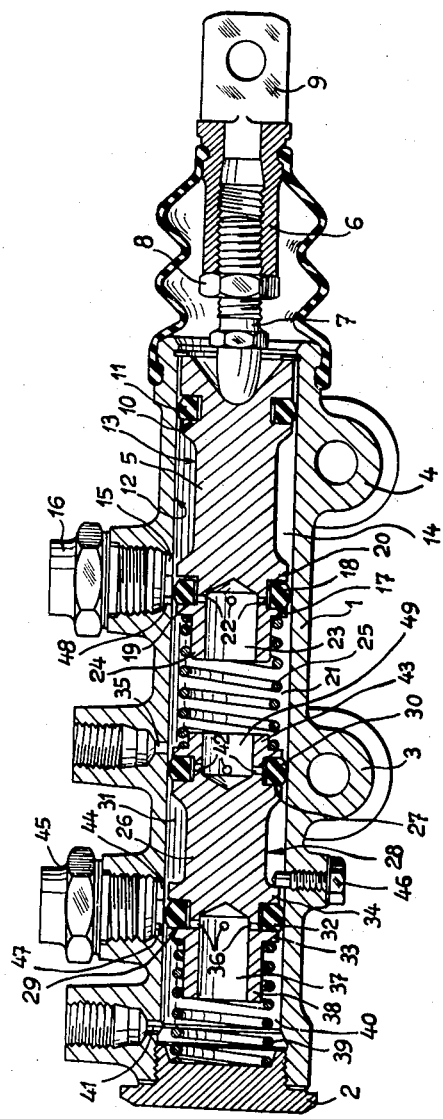
INVENTOR.
Philip S. Baldwin,
BY

United States Patent Office 2,831,324
Patented Apr. 22, 1958

2,831,324

MASTER CYLINDER FOR HYDRAULIC BRAKE SYSTEM

Philip Sidney Baldwin, Florence, Italy, assignor to Fiat Società per Azioni, Turin, Italy Application October 17, 1955, Serial No. 540,865

Claims priority, application Italy October 20, 1954

11 Claims. (Cl. 60—54.6)

This invention relates to a master cylinder for hydraulic brake systems, more particularly for motor vehicles, of the type comprising a cylinder, a master piston slidable in said cylinder under the action of external control means, a first conduit supplying fluid to a pressure chamber associated with the said piston, first valve means for cutting out communication between the pressure chamber and the fluid supply conduit on the compression stroke and reestablishing communication on the return stroke, a conduit extending from the said pressure chamber for supplying a first set of wheel cylinders, a secondary piston movable in the said cylinder controlled by the fluid pressure built up during the compression stroke in the pressure chamber associated with the master piston; a second conduit supplying fluid to a pressure chamber associated with the said secondary piston, second valve means for cutting out communication between the pressure chamber associated with the said secondary piston and the second fluid supply conduit on a compression stroke and re-establishing communication on a return stroke of the secondary piston, a conduit extending from the pressure chamber associated with the said secondary piston for supplying a second set of wheel cylinders, and resilient means for causing the pistons to perform their return stroke as operation of the master piston ceases.

Master cylinders of this type are known for instance through Italian Patent No. 347,416 to Hydraulic Brake Company filed on December 28, 1936.

Brakes of this type are, however, mostly elaborate and expensive in construction and usually require a larger number of component parts differing in shape and structure.

It is the object of this invention to provide a master cylinder for brake systems of the type referred to above simpler and cheaper in construction, in which the number of component parts is minimized.

A further object of this invention is to provide a master cylinder for brakes of the type referred to, in which all the sealing members and valves are similar in form and size.

With the above purposes in view this invention has for its object a master cylinder for hydraulic brake systems, more particularly for motor vehicles, of the type described, characterised by the fact that the first and second valve means each comprise a resilient ring mounted free to float axially between abutments connected to the associated piston, the outer ring face being in sliding contact with the cylinder wall, and means for conveying fluid at the pressures existing in the pressure chamber associated with the piston into contact with the inner face of the associated floating ring.

Further advantages and characteristic features of this invention will be understood from the appended specification referring to the accompanying drawing which is an axial sectional view of a master cylinder according to this invention.

The master cylinder comprises a cylindrical body 1 closed at one end by screw plug 2. The cylindrical body 1 is provided with bored ears 3, 4 for attachment of the master cylinder to the motor vehicle structure.

In the cylindrical body 1 moves a master piston 5 which is operated by a push member 6 through an adjusting member 7. The push-member 6 is provided with an internal screw-thread, the adjusting member 7 being provided with an external screw-thread by which it can be screwed more or less into the push-member 6. The adjusting member 7 has screwed thereon a lock nut 8. The push member 6 is actuated for operating the piston through means, not shown on the drawing, connected to the brake pedal and acting on the attachment bracket 9 on the push member 6.

The master piston 5 is formed with an annular groove 10 seating a sealing member 11 in the form of a ring of resilient material, such as rubber in sliding contact with the internal wall 12 of the cylindrical body 1.

In the outer surface of the piston 5 a further groove 13 is cut in order to form an annular chamber 14 between the groove surface and inner wall 12 of the cylindrical bore in the body 1. A port 15 supplying the in-coming fluid flowing from the main reservoir over the connecting pipe 16 leads to the groove 13.

The axial length of the groove 13 is such that the port 15 constantly connects with the annular chamber 14 whatever the position of the piston 5.

A third annular groove 17 is formed in the outer surface of the piston 5 seating a floating ring 18 spaced by its base from the groove bottom, having its outer surface in sliding contact with the inner wall 12 of the cylinder and capable of free axial movement between the two abutments 19, 20 which axially confine the groove 17.

The outer diameter of the abutments 19, 20 is materially smaller than the diameter of the surface 12, whereby annular gaps are formed between the said abutments and surface 12.

The groove 17 connects at its bottom with the pressure chamber 21 associated with the piston 5 over ports 22 opening into a bore 23 formed partly in a cylindrical extension 24 on the piston 5 and in the piston 5 itself, respectively.

The compression chamber 21 associated with the piston 5 delivers fluid through a delivery port 35 to a pipe (not shown on the drawing) supplying a set of brake cylinders.

On its pressure stroke the master piston 5 acts through a helical spring 25 against the bottom of a further piston 26, referred to as auxiliary piston, likewise formed with three grooves 27, 28, 29, respectively. The groove 27 houses an annular packing 30; the groove 28 confines together with the inner surface 12 of the cylindrical body an annular chamber 31, the groove 29 seating a floating ring 32 having its base likewise spaced from the groove bottom, the outer ring surface being in sliding contact with the wall 12, the ring being capable of free axial displacement between two abutments 33, 34 axially confining the said groove 29. The outer diameter of the abutments 24, 33 is smaller than the diameter of the surface 12.

The bottom of the groove 29 is connected through a plurality of ports 36 with a recess 37 bored in part within a cylindrical extension 38 on the piston 26 and in the piston 26 itself, respectively. The extension serves inter alia as a guide for the spring 39 bearing at one end on the abutment 33 and at its other end on the plug 2.

The pressure chamber 40 associated with the piston 26 connects over a delivery port 41 with a pipe (not shown on the drawing) leading to a further set of brake cylinders.

The bottom of the groove 27 is bored with holes 42 connecting the said groove 27 with a bore 49 in part in an extension 43 on the piston 26 and in the piston 26 itself, respectively, connecting in turn with the pressure chamber associated with the piston 5. The extension 43 serves moreover as a guide for the spring 25.

The annular chamber 31 is fed through a port 44 connected over a connecting pipe 45 to a further fluid supply.

A stop screw 46 is screwed into the wall of the cylindrical body 1 and comes into contact with the two ends of the annular groove 28, thereby limiting displacement in either direction of the piston 26.

The length of the annular groove 28 is such that, with the piston 26 in any position whatever, the ports 44 constantly connect with the annular chamber 31. Directly past the floating rings 32, 18 in the direction of movement for performing the pressure stroke two supply ports 47, 48, respectively are provided, which connect with the connecting pipes 45, 16, respectively.

The master cylinder operates as follows:

When the master piston 5 is in its inoperative position, its pressure chamber 21 connects with the annular chamber 14 hence with the supply port 15 through the bore 23, holes 22, clearance between the base of the floating ring and groove bottom, clearance between the ring side and abutment 20 and clearance between the outer surface of the abutment 20 and inner surface 12 of the cylindrical body 1. When the master piston 5 is moved by the push member 6, the floating ring 18 which is in frictional contact with the wall 12 of the cylindrical body 1 bears against the abutment 20 cutting out communication between the pressure chamber 21 of the piston 5 and chamber 14; on further movement of the piston 5 the port 48 is covered, whereby the fluid pressure in the pressure chamber 21 rises and fluid is forced through port 35 to a set of wheel cylinders; at the same time, the pressure which has built up in the chamber 21 acts on the bottom of the piston 26 moving the latter to the left (on the drawing). The floating ring 32, which is in frictional contact with the wall 12 of the cylindrical body, is pressed against the abutment 34 cutting out the communication between the pressure chamber 40 of the piston 26 and annular chamber 31, which had been previously established through the bore 37, ports 36, gap between the base of the floating ring 32 and bottom of the annular groove 29, gap between the side of the floating ring 32 and abutment 34 and between the outer surface of the said abutment 34 and surface 12. When a short length of the pressure stroke has been performed, port 47 connecting with the supply port 44 is closed, whereby the pressure in the pressure chamber 40 of the piston 26 rises and fluid is forced through the delivery port 41 to a further set of wheel cylinders.

The load of the spring 39 should be greater than the load of spring 25 in order to constantly return the piston 26 to its inoperative position against the opposing action of spring 25.

As the thrust of the push member 6 on the piston 5 ceases, the springs 39 and 25 become operative and rapidly displace the pistons 26 and 5 to the right (on the drawing). The floating rings 32 and 18 are pressed against the abutments 33 and 19, respectively, thereby re-establishing communication between the pressure chamber 40 and annular chamber 31 in the piston 26 and between the pressure chamber 21 and annular chamber 14 in the piston 5. Since the annular chambers 31, 14 constantly connect with the fluid supply, fluid can flow from the said supply ports 47, 48 to the pressure chambers 40, 21, respectively, so that no suction is set up in these chambers tending to prevent return of the pistons 26, 5 to their inoperative position.

When the pistons 26, 5 are in their inoperative position, the brake cylinders further returning oil through delivery ports 41, 35, the excess oil which cannot collect in chambers 40 and 21 already full of oil, escapes through supply ports 47, 48 back to the supply.

In addition to establishing communication between the pressure chambers 40, 21 and the annular chambers 31, 14, respectively, during the compression stroke the ports 36, 22 allow a pressure to be applied to the base of the floating rings, thereby raising the pressure by which these rings are applied to the surface 12 of the cylindrical body 1 and improving the effectiveness of the seal.

The ports 42 perform a similar function for the corresponding associated ports. If desired, ports could be provided within the piston 5 for the purpose of applying the pressure existing in the compression chamber 21 to the base of the sealing ring 11.

It will be seen from the drawings that the floating rings 32 and 18 and packings 30 and 11 are of the same shape and size; moreover, only pistons 5 and 26 move within the cylinder.

The master cylinder according to this invention is therefore much simpler and less expensive in construction, assembly and maintenance than master cylinders of the same type employed heretofore.

What I claim is:

1. Master cylinder for hydraulic brake systems, of the type comprising a cylinder, a master piston moving in the said cylinder under the action of external control means, a first supply port suppling fluid to a pressure chamber associated with the said piston, first valve means for cutting out communication between the pressure chamber associated with the said master piston and the fluid supply conduit on the pressure stroke of said piston and re-establishing it on its return stroke, a first delivery port extending from the said pressure chamber for supplying a first set of wheel cylinders, an auxiliary piston movable in the said cylinder controlled by the fluid pressure set up on the pressure stroke in the pressure chamber associated with the master piston, a second supply port supplying fluid to the pressure chamber associated with the said auxiliary piston, second valve means for cutting out communication between the pressure chamber associated with the said auxiliary piston and second fluid supply port on its pressure stroke and re-establishing it during its return stroke, a second delivery port extending from the pressure chamber associated with the said auxiliary piston for feeding a second set of wheel cylinders, and resilient means for causing the pistons to perform their return stroke as operation of the master piston ceases, characterised by the fact that the first and second valve means each comprise a resilient ring mounted capable of freely floating in an axial direction between two abutments connected to the associated piston, the outer ring face being in sliding contact with the cylinder wall, and means for bringing fluid at the pressure existing in the pressure chamber of each piston into contact with the inner face of the associated floating ring.

2. Master cylinder as claimed in claim 1, characterised by the fact that an annular groove is cut in each piston adjacent its respective pressure chamber, the said groove being materially greater in width than the width of the floating ring, with ports opening into the base of said groove which connect with the pressure chamber of the associated piston.

3. Master cylinder as claimed in claim 1, characterised by the fact that an annular groove is cut in each piston and is of a length such as to connect with the fluid supply port at any piston position, the said groove being separated from the groove seating the floating ring by one of the abutments, the said abutment being of an outer diameter such as to leave an annular gap between the groove connecting with the fluid supply conduit and the groove housing the floating ring.

4. Master cylinder as claimed in claim 1, characterised by the fact that the said supply ports are overrun by the floating rings as soon as the pistons start movement for performing their pressure stroke and are adapted to return the in-coming fluid from the wheel cylinders when the master and auxiliary piston have completed their return stroke and the wheel cylinder pistons have not yet completed their return stroke and still deliver liquid.

5. Master cylinder as claimed in claim 1, characterised by the fact that it comprises sealing means between the piston side remote from the associated pressure chamber and cylinder wall, in the form of resilient rings seated in annular grooves in the pistons.

6. Master cylinder as claimed in claim 1, characterised by the provision of means for limiting the displacement of the secondary piston between two positions.

7. Master cylinder as claimed in claim 6, characterised by the fact that the said means for limiting the displacement of the secondary piston between two well-defined positions is in the form of a screw reaching within the annular groove connecting with the fluid supply conduit at any position of the secondary piston.

8. A master cylinder assembly for an hydraulic brake system comprising a cylinder, a master piston moving in said cylinder under the action of external control means, a first pressure chamber in said cylinder associated with said piston, supply conduit means supplying fluid to said first pressure chamber, first valve means for cutting off communication between the first pressure chamber and said supply conduit means on the pressure stroke of said piston and reestablishing it on its return stroke, delivery conduit means extending from said first pressure chamber for supplying a first set of wheel brake cylinders; an auxiliary piston movable in said cylinder controlled by the fluid pressure set up on the pressure stroke in the first pressure chamber, a second pressure chamber in said cylinder adjacent and associated with said auxiliary piston, supply conduit means supplying fluid to said second pressure chamber, second valve means for cutting out communication between the second pressure chamber and the said supply conduit means on the pressure stroke of said auxiliary piston and for re-establishing communication on its return stroke, delivery conduit means extending from said second pressure chamber for feeding a second set of wheel brake cylinders, and resilient means for causing the pistons to perform their return strokes as operation of the master piston ceases, each piston being formed with an annular groove adjacent its associated pressure chamber and with a passage connecting the groove to the adjacent pressure chamber, the side walls of said grooves defining abutments, and the passages opening at the bottom walls of the grooves between the side walls thereof, said first and second valve means comprising respective resilient rings slidably mounted in the grooves and being freely slidable axially therein, the width of the grooves being substantially greater than the width of the rings, the outer faces of the rings being in sliding contact with the cylinder wall, the rings being normally disengaged from the bottom walls of the grooves and being sufficiently resilient to be urged into sealing contact with the cylinder wall responsive to the fluid pressure developed in the pressure chambers.

9. The structure of claim 8, wherein the pistons are formed with additional grooves on the end portions thereof remote from their associated pressure chambers, and resilient sealing rings seated in said additional grooves and slidably and sealingly engaging the cylinder inner wall.

10. The structure of claim 8, and stop means in the cylinder engageable with the auxiliary piston to limit displacement of said auxiliary piston between two predetermined positions in the cylinder.

11. The structure of claim 10, wherein said auxiliary piston is formed with a longitudinal recess and wherein said stop means comprises a screw threadedly engaged through the cylinder wall and extending into said recess.

References Cited in the file of this patent

UNITED STATES PATENTS

| 2,194,816 | Van Vestraut et al. | Mar. 26, 1940 |
| 2,396,155 | Christensen | Mar. 5, 1946 |
| 2,577,858 | Sampson | Dec. 11, 1951 |

UNITED STATES PATENT OFFICE
CERTIFICATE OF CORRECTION

Patent No. 2,831,324 April 22, 1958

Philip Sidney Baldwin

It is hereby certified that error appears in the above numbered patent requiring correction and that the said Letters Patent should read as corrected below.

In the grant, line 2, for "assignor to Fiat Società per Azioni, of Turin, Italy, -- read -- assignor of one-half to Fiat Società per Azioni, of Turin, Italy,; line 11, for "Fiat Società per Azioni, its successors" read -- Philip Sidney Baldwin, his heirs or assigns, and Fiat Società per Azioni, its successors --; in the heading to the printed specification, lines 4 and 5, for "assignor to Fiat Società per Azioni, Turin, Italy" read -- assignor of one-half to Fiat Società per Azioni, Turin, Italy --.

Signed and sealed this 4th day of November 1958.

(SEAL)

Attest:

KARL H. AXLINE
Attesting Officer

ROBERT C. WATSON
Commissioner of Patent